United States Patent [19]
Pennington et al.

[11] Patent Number: 5,676,091
[45] Date of Patent: Oct. 14, 1997

[54] CUTTLE BONE HOLDER

[76] Inventors: Timothy V. Pennington; DeAnna S. Pennington, both of Rte. 1, Box 3731, Mountain City, Tenn. 37683

[21] Appl. No.: 362,018

[22] Filed: Dec. 22, 1994

[51] Int. Cl.⁶ ................................................. A01K 39/00
[52] U.S. Cl. ................................................. 119/477
[58] Field of Search ................................. 119/430, 431, 119/432, 454, 456, 464, 466, 475, 477

[56] References Cited

U.S. PATENT DOCUMENTS

| | | |
|---|---|---|
| 385,650 | 7/1888 | Wemple . |
| 4,602,757 | 7/1986 | Signorelli . |
| 4,669,421 | 6/1987 | Flintjer . |

*Primary Examiner*—Thomas Price
*Attorney, Agent, or Firm*—Ronald P. Kananen

[57] ABSTRACT

In order to safely support a cuttle bone in a bird cage in a manner to prevent fragments of the bone breaking off and falling to the bottom of the cage or the bone becoming contaminated with bird defecation, a housing is formed of two halves or portions which telescopically engage with one another to form a variable size enclosure which has a window through which the cuttle bone can be pecked. Birds are prevented from sitting on the top of the container in a manner which allows defecation to fall on the cuttle bone by a slanted upper edge.

4 Claims, 7 Drawing Sheets

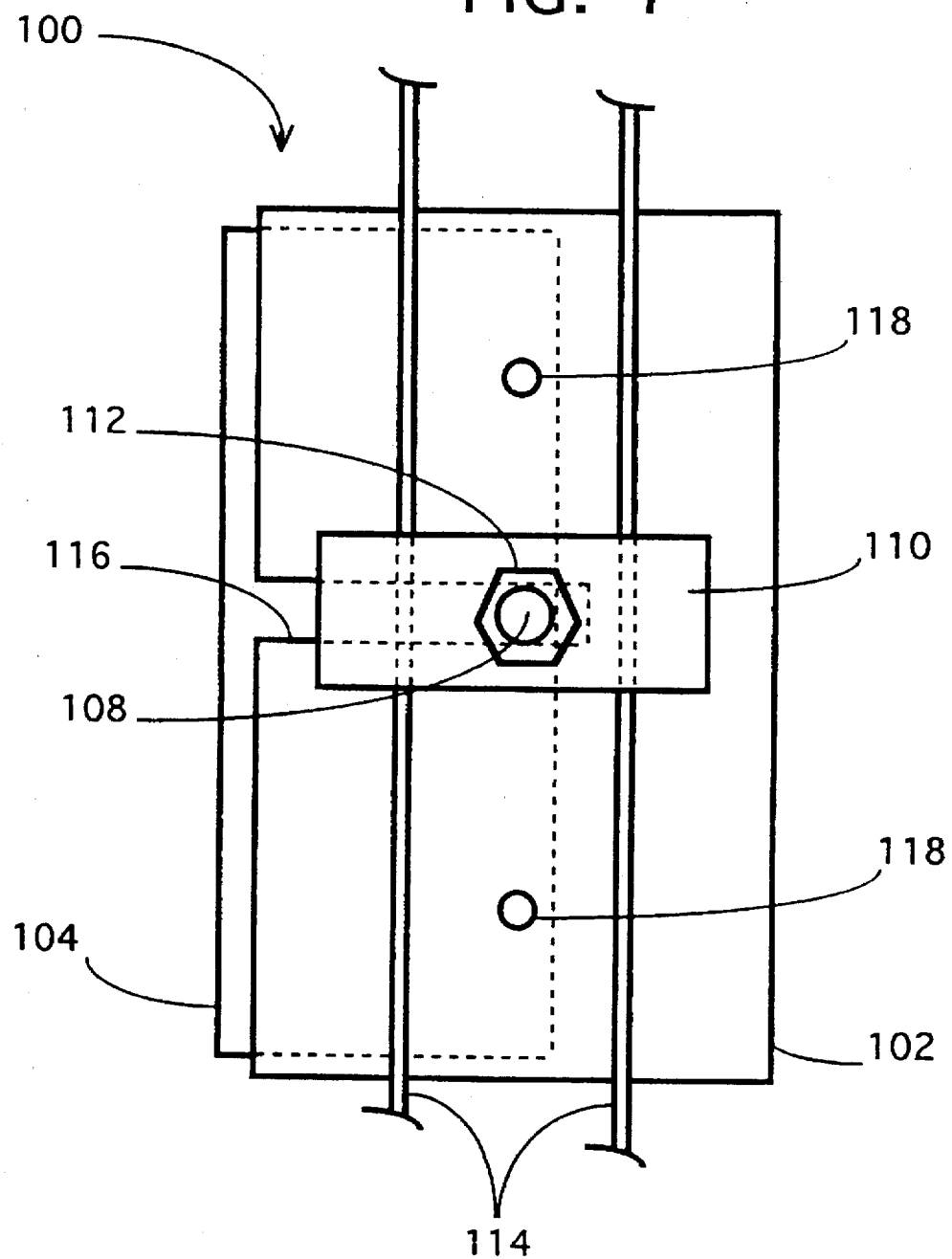

CUTTLE BONE HOLDER

BACKGROUND OF THE INVENTION

1. Field of the Invention

The present invention relates generally to a holder for a cuttle bone which can be removably mounted in a bird cage. More specifically, the present invention relates to a cuttle bone holder which comprises a housing having a window through which the cuttle bone can be pecked and which prevents large fragments from simply falling to the bottom of the cage and becoming unacceptably soiled.

2. Description of the Prior Art

As is well known, there is a need to be able to support a cuttle bone in a bird cage in a manner which enables the cuttle bone to be readily and safely accessed by a bird or birds in the cage. Examples of arrangements which have been proposed for this purpose are found in U.S. Pat. Nos. 385,650 issued on Mar. 16, 1888 in the name of Wemple; 4,602,757 issued on Jul. 29, 1986 in the name of Signorelli; and 4,669,421 issued on Jun. 2, 1987 in the name of Flintjer.

However, these arrangements have suffered from a common drawback in that the birds may peck away at the cuttle bone in a manner in which large fragments break away from the main body, fall to the bottom of the cage, and become unrecoverably contaminated with bird defecation and the like. This of course requires the fragments which are ruined by this contamination to be thrown out.

In addition to this, these arrangements have suffered from the problem that smaller birds are actually able to perch on part of either the cuttle bone or the holder and defecate directly onto the cuttle bone. This of course results in contamination and usually requires the whole bone to be wastefully thrown out.

Other drawbacks apart from the wastage feature tend to be encountered with the arrangements disclosed in the above mentioned patents. For example, as shown in FIG. 1, the arrangement in U.S. Pat. No. 385,650 is such as to use a butterfly clip type of arrangement 10 which is provided with a clamp 11 which allows the clip 10 to be fastened to the bars 12 of a bird cage, and serrations or teeth 15 along the leading edges of the clip 10 so as to provide a secure grip on a cuttle bone 16. These teeth 15 however pose a safety problem in that, depending on the size of the bird and the power of the spring 16 which biases the jaws 17, 17 of the clip 10 together, it is possible that a bird will alight on the clip 10 and/or the cuttle bone 16 and peck away at the bone 16 in a manner which invites the bone to suddenly fall out of the clip 10 and bring about the situation wherein the clip 10 may snap shut on a foot or even a beak of the bird with detrimental results.

The arrangement disclosed in U.S. Pat. No. 4,602,757 illustrated in FIG. 2 features the use of a sharp pointed metal support 20 which is provided with a self-tapping type of thread. The cuttle bone 21 is pressed onto and screwed down into place on this threaded support member. A base member 22 which is provided at the lower end of the support 20 is arranged to be tightened down so as to clamp on two adjacent bars 24 of a bird cage.

However, with this arrangement, once the cuttle bone is pecked away to the degree whereat the sharp pointed end 20a of the threaded support 20 projects out of the remaining portion of cuttle bone 21, the bird or birds are exposed to the danger of being impaled or having their beaks or wings damaged by contact with the sharp metal portions of this threaded support 20.

Accordingly, even though there has been a long felt need for simple arrangement by which pieces of cuttle bone can be suitably supported within a bird cage, an arrangement which can prevent wasteful soilage of the cuttle bone and which supports the bone so that the bird are not exposed to possible dangers has not yet been forthcoming.

SUMMARY OF THE INVENTION

It is an object of this invention to provide a cuttle bone holder which is both simple and safe.

It is a further object of the invention to provide a cuttle bone holder which prevents the bone from becoming contaminated by bird defecation.

It is another object of the invention to provide a cuttle bone holder which is adjustable so as to accommodate various widths of cuttle bone and which can be quickly and easily secured in position on the bars of a bird cage.

In brief, the above objects are achieved by an arrangement wherein a housing is formed of two portions, such as halves, which can be telescopically engaged with one another to form a variable size enclosure having a window through which the cuttle bone can be pecked. Birds are prevented from sitting on the top of the container in a manner which allows defecation to fall on the cuttle bone by the provision of a slanted upper edge or like type of technique applied to the upper edge.

A first aspect of the invention resides in a container for enclosing a cuttle bone comprising: a first portion; a second portion adapted to be partially inserted into the first portion; and a clamp supported on the second portion by a bolt which projects out of a rear surface of the second portion, the first portion being formed with an elongate horizontally extending slot for slidably receiving the bolt when the second portion is inserted into the first portion, the first and second portions being formed with first and second cut-out portions respectively, the first and second cut-out portions cooperating with one another when the second portion is inserted into the first portion to define a window which permits birds to gain access to material disposed in the interior of the container which is defined by the first and second portions. Preferably, the first and second portions are about equal to form container halves.

A second aspect of the invention resides in a holder for a cuttle bone which can be detachably connected to a bird cage comprising: first and second telescopically interconnectable portion casing members one of which is slidably received in the other; means defining a window in the housing through which birds can peck at a cuttle bone in the holder; clamp means for clamping the holder to a portion of a bird cage; and projection means for preventing the cage from rotating by more than a predetermined amount from a predetermined position when it is clamped on the portion of the bird cage. Preferably, the first and second casing members form halves of the member.

BRIEF DESCRIPTION OF THE DRAWINGS

The various features and advantages of the present invention will become more clearly understood as a description of an embodiment of the invention is made with reference to the appended drawings in which:

FIGS. 4A and 4B are rear elevations of the two portions shown in FIGS. 1A and 1B showing details of the clamp and slot arrangement which allows the portions to be connected together and secured to the wires of a bird cage or the like;

FIG. 7 is a rear elevation showing the two portions fitted together and clamped in position on the bars of a bird cage.

DETAILED DESCRIPTION OF THE PREFERRED EMBODIMENTS

FIGS. 3A to 7 show constructional features of the preferred embodiment of the present invention. As will be readily appreciated from these drawings, this embodiment of the invention comprises two portions, such as halves 102, 104, one which can be slidably fitted into the other in a manner which forms a container 100 having a window 106 through which access to the cuttle bone disposed in the container is possible.

Figure 1:
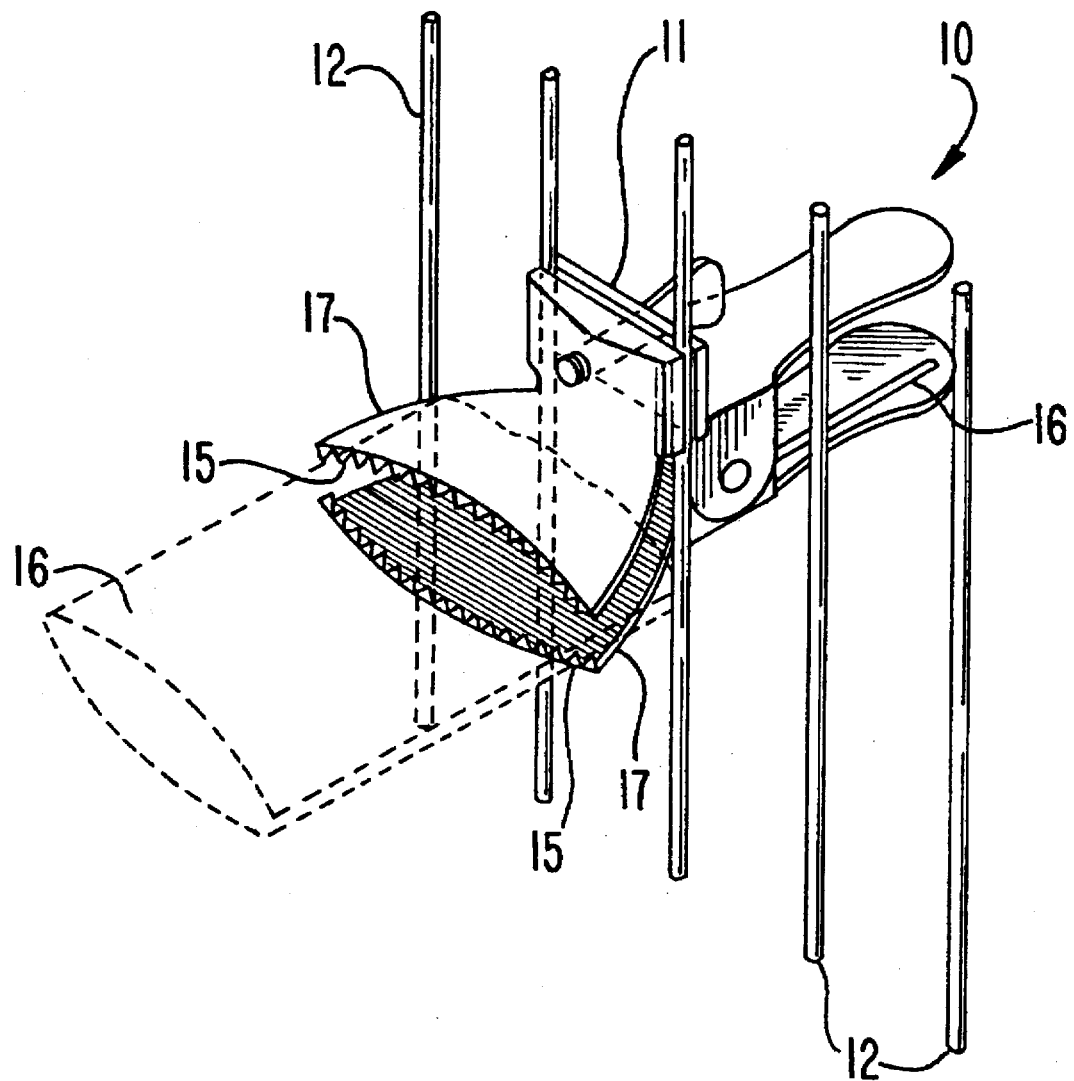
FIGS. 1 and 2 show two of the prior art arrangements discussed in the opening paragraphs of the disclosure.
Figure 2:
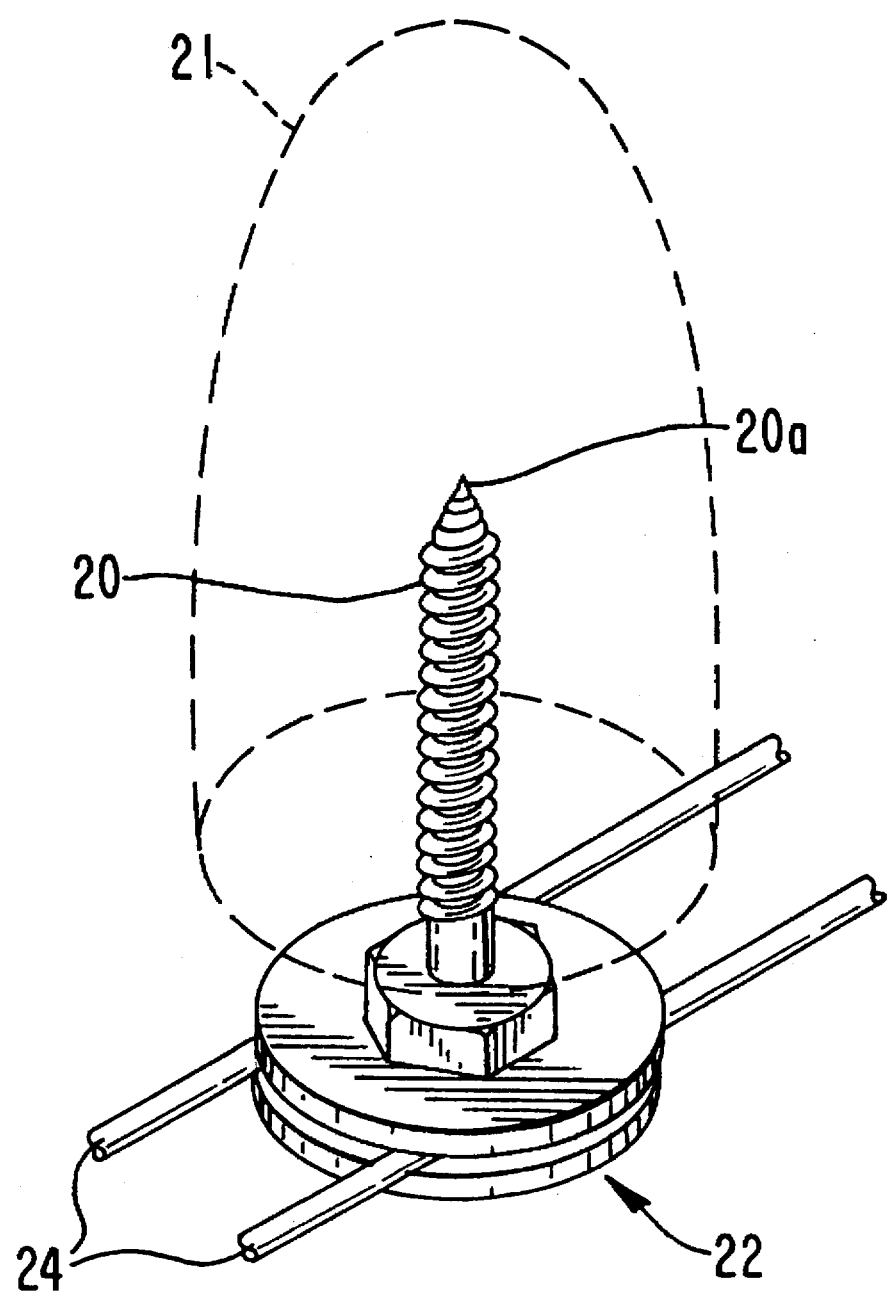
Figure 3B:
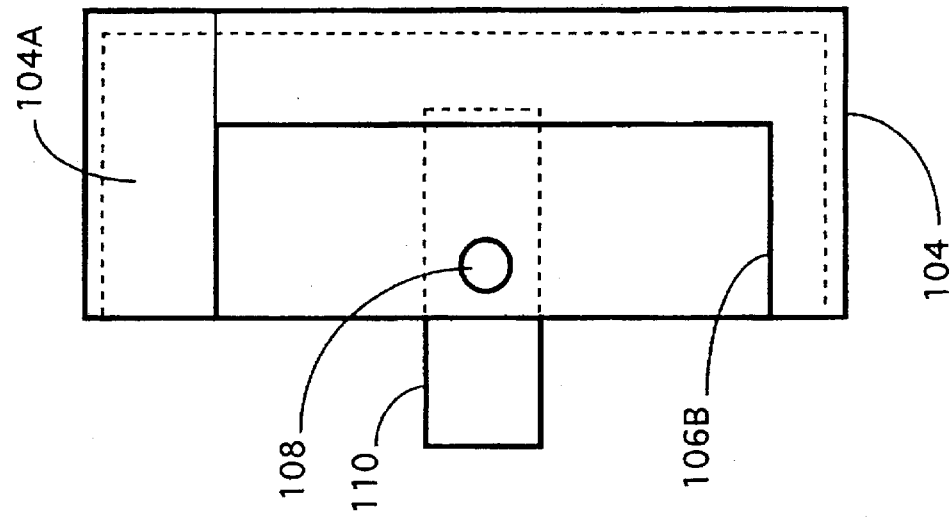
FIGS. 3A and 3B are front elevations of the two portions of the cuttle bone holder which can be fitted together in a manner to enclose a cuttle bone in accordance with an embodiment of the present invention.
Figure 3A:
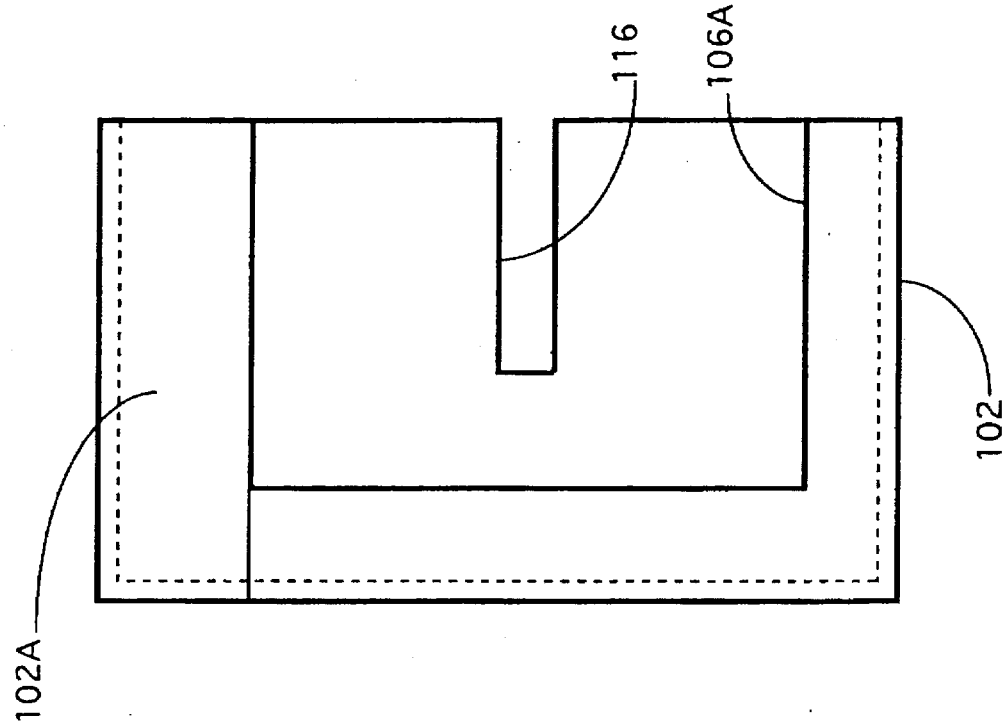
Figure 4B:
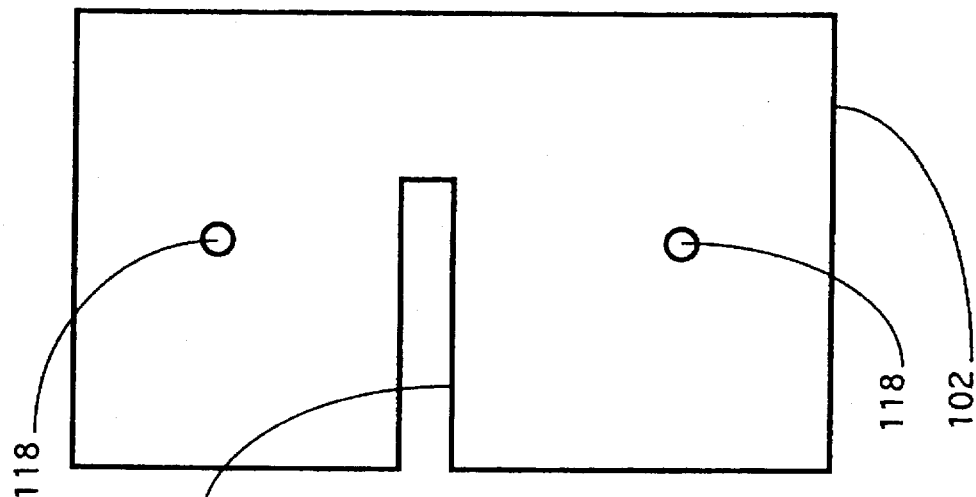
Figure 4A:
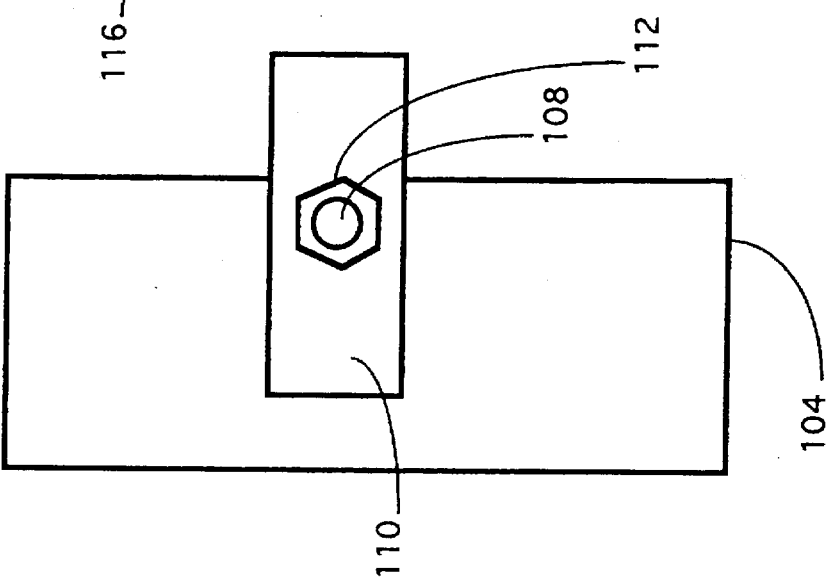
Figure 5A:
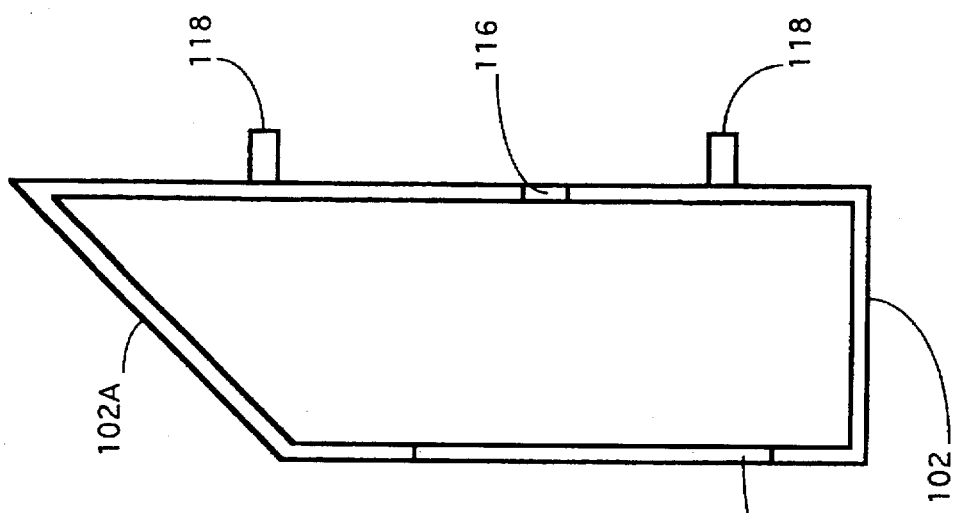
FIGS. 5A and 5B are side elevations of the two portions of the cuttle bone holder according to the present invention as seen looking into the open ends of the two portions.
Figure 5B:
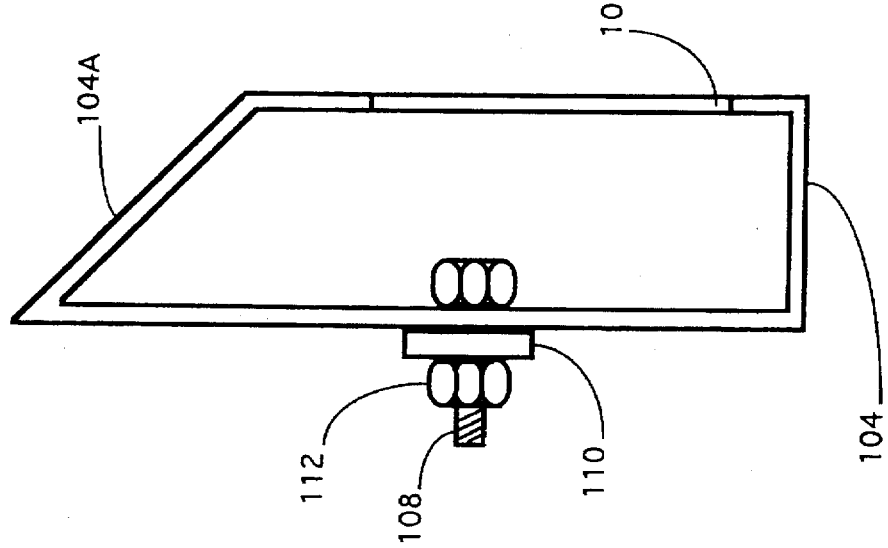
Figure 6:
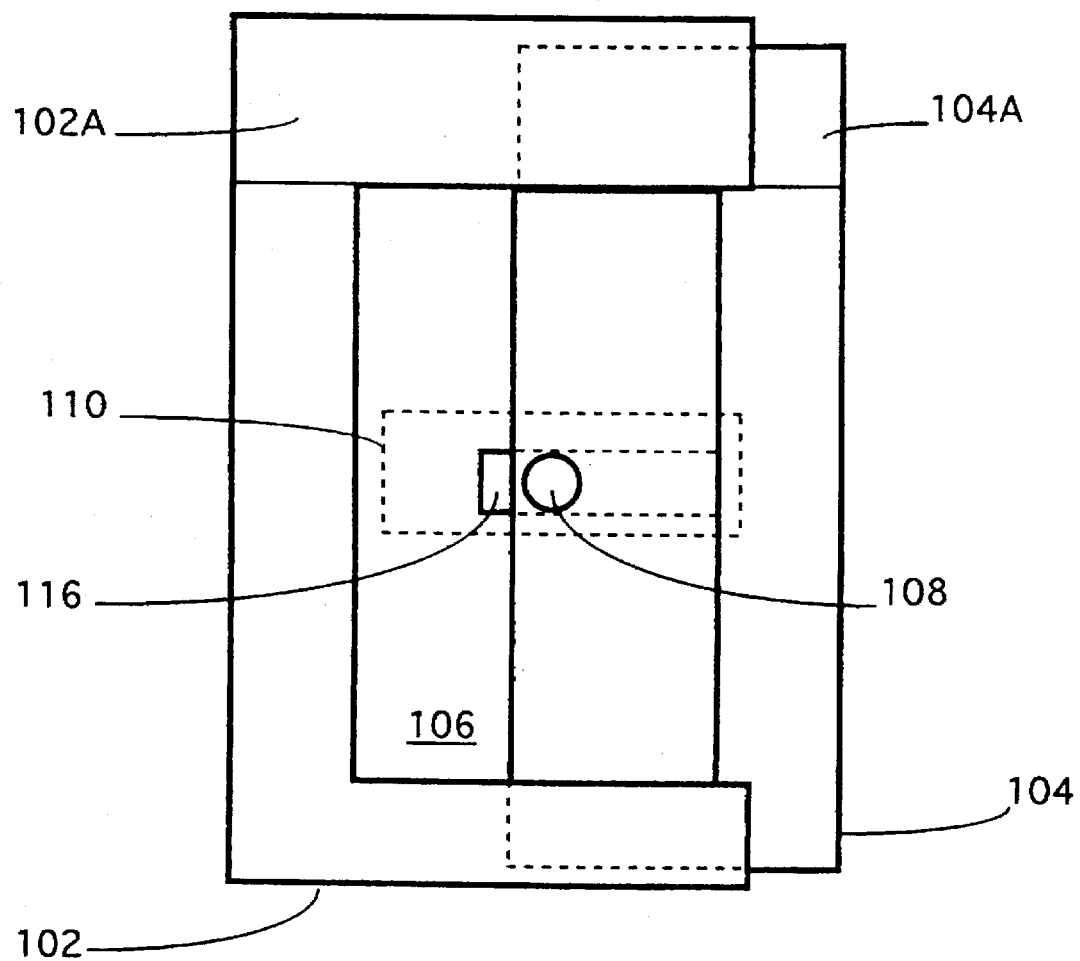
FIG. 6 is a front elevation showing the two portions fitted together in a manner to define the enclosure which characterizes the present invention.

More specifically, in this arrangement the upper edges 102A, 104A of each of the two portions 102, 104 is slanted at an angle of 45 degrees or steeper, as shown in FIGS. 5A and 5B, to prevent birds from perching on top of the container 100. This measure is taken to prevent defecation from possibly falling down onto the cuttle bone through the window 106. The second portion 104 is slightly smaller than the first 102 in order to permit it be telescopically inserted into the interior of the first portion 102.

The second portion 104 is further provided with a bolt 108 which projects out of a rear wall surface. A clamp plate 110 is supported on the bolt 108. A nut 112 is threaded onto the end of the bolt 108 to retain the clamp plate 110 in position and permit the clamp plate 110 to be tightened against the bars of a bird cage in the manner illustrated in FIG. 7. The first portion 102 is formed with an elongate slot 116 which is arranged to allow the bolt 108 to slide therealong when the two portions are operatively connected with one another. As will be best appreciated from FIG. 6, when the two portions 102, 104 are placed together, a rectangular window 106 is defined in the housing 100 through which birds may peck at a piece of cuttle bone or the like type of material (not shown) which has been disposed in the container 100. As will be appreciated, this window need not be rectangular in shape and any other pleasing configuration can be chosen merely by modifying the configuration of the cut-out portions 106A and 106B formed in the first and second portions 102, 104 respectively. Preferably, the first and second portions are halves of the configuration.

In order to prevent the housing from rotating about the bolt, the first portion 102 is formed with two pin-like projections 118. These projections 118 are arranged to engage adjacent bars 114 of the bird cage.

It will also be noted that when the nut 112 is tightened down to force the clamp plate 110 against bars 114 of the cage, the two portions 102, 104 of the housing 100 are also secured together by the reaction which draws the two portions together.

A further feature of this embodiment resides in that the width of the housing 100 is adjustable thus allowing for different sizes of cuttle bone. The clamp plate 110 is also elongate and sized so that it can be passed between the bars of bird cage when rotated to a "vertical" position and the rotated back to a "horizontal" position wherein tightening of the nut clamps the housing together and simultaneously secures it to the bars 114 of the cage.

The size of the housing can be varied. For example only, with the illustrated embodiment it is contemplated that three different basic sizes, small, medium and large will suffice. Approximate size can range from 4–×3"×1× to 16"×6"×2". The housing is preferably made of plastic and formed by injection molding. However, the invention is in no way limited to this technique and type of material.

It will of course be appreciated that the invention is not limited to the disclosed embodiment and that the housing according to the present invention can be modified and varied in a number of different ways which are self-evident in light of the preceding disclosure.

What is claimed is:

1. A container for enclosing a cuttle bone comprising:

a first container portion;

a second container portion which is partially inserted into said first portion to form said container; said container further comprising:

a clamp supported on said second container portion by a bolt which projects out of a rear surface of said second container portion, said first container portion being formed with an elongate horizontally extending slot in which said bolt slides when said second container portion is inserted into said first container portion, said first and second container portions being formed with first and second cut-out portions respectively, said first and second cut-out portions cooperating with one another when said second container portion is inserted into said first container portion to define a window which permits birds to gain access to material disposed in the interior of the container which is defined by said first and second container portions.

2. A container as set forth in claim 1, wherein the first and second portions are formed so that the container has a slanted upper edge which prevents birds from perching thereon.

3. A container as set forth in claim 1, wherein said first container portion is formed with at least one projection which is adapted to engage bars of a cage and prevent the container from rotating by more than a predetermined amount with respect to the bars of the cage.

4. A holder for a cuttle bone which can be detachably connected to a bird cage comprising:

a casing formed of first and second telescopically interconnectable portion casing members one of which is slidably received in the other to form the casing;

means defining a window in the casing through which birds can peck at a cuttle bone in the casing;

clamp means connected with the casing for clamping the holder to a portion of a bird cage; and projection means on the casing for engaging the portion of the bird cage and preventing the casing from rotating by more than a predetermined amount from a predetermined position with respect to the bird cage when it is clamped on the portion of the bird cage.

* * * * *